United States Patent [19]

Förster

[11] 4,408,984
[45] Oct. 11, 1983

[54] BURNER FOR THE FORMATION AND COMBUSTION OF AN IGNITABLE MIXTURE OF A LIQUID FUEL AND COMBUSTION AIR

[75] Inventor: Siegfried Förster, Alsdorf, Fed. Rep. of Germany

[73] Assignee: Kernforschungsanlage Jülich Gesellschaft mit beschränkter Haftung, Julich, Fed. Rep. of Germany

[21] Appl. No.: 249,704

[22] Filed: Mar. 31, 1981

[30] Foreign Application Priority Data

Apr. 5, 1980 [DE] Fed. Rep. of Germany ....... 3013428
Dec. 18, 1980 [DE] Fed. Rep. of Germany ....... 3047702

[51] Int. Cl.³ .......................................... F23D 13/40
[52] U.S. Cl. ................................. 431/354; 431/208; 431/243; 431/353
[58] Field of Search ............... 431/208, 238, 242, 243, 431/353, 88, 33, 326, 328, 186, 189

[56] References Cited

U.S. PATENT DOCUMENTS

| 54,243 | 4/1866 | Yeilding | 431/353 |
| 1,387,450 | 8/1921 | Caldwell | 431/353 |
| 2,043,597 | 6/1936 | Sloyan | 431/208 |
| 3,119,439 | 1/1964 | Weiss | 431/353 |
| 4,013,396 | 3/1977 | Tenney | 431/208 |

Primary Examiner—Larry Jones
Assistant Examiner—Carl Price
Attorney, Agent, or Firm—Scully, Scott, Murphy & Presser

[57] ABSTRACT

A burner for the formation and combustion of an ignitable mixture of liquid fuel and combustion air, which includes a closed combustion chamber for the infeed of the fuel with porous walls permeable to the fuel. The combustion chamber is arranged within a flow chamber which is streamed through by preheated combustion air flowing towards the combustion zone.

7 Claims, 2 Drawing Figures

BURNER FOR THE FORMATION AND COMBUSTION OF AN IGNITABLE MIXTURE OF A LIQUID FUEL AND COMBUSTION AIR

BACKGROUND OF THE INVENTION

1. Field of the Invention

The present invention relates to a burner for the formation and combustion of an ignitable mixture of liquid fuel and combustion air, which includes a closed combustion chamber for the infeed of the fuel with porous walls permeable to the fuel. The combustion chamber is arranged within a flow chamber which is streamed through by preheated combustion air flowing towards the combustion zone.

The invention is also directed to a burner for the formation and combustion of the ignitable mixture of liquid fuel and combustion air which includes a fuel chamber fillable with fuel for the infeed of the fuel, which is equipped with porous walls permeable to the fuel and is hydraulically displaceably arranged within a combustion chamber, which is streamed through by preheated combustion air towards the combustion zone, in opposition to a counter force, wherein a hydraulic cylinder which guides the fuel chamber includes a connection for the inlet of fuel as the hydraulic operating medium, and a fuel conduit leads from the fuel-filled inner space of the hydraulic cylinder towards the inner space of the fuel chamber, and wherein there is also provided a discharge for the fuel leading from the fuel chamber through the inner space of the hydraulic cylinder.

2. Discussion of the Prior Art

Burners of this type are determined for industrial furnaces, as well as for heat generators of smaller sized unit. In these burners the liquid fuel passes through the porous walls of the fuel chamber and vaporizes in the preheated combustion air streaming through the combustion chamber. As a result of the vaporization of the liquid fuel on the surface of the porous walls there is prevented an undesirable overheating of the liquid fuel which would lead to cracking. In the combustion chamber, the fuel and combustion air are mixed together and introduced as an ignitable mixture into the combustion zone. In this connection, reference may be had to German Laid-open Patent Appln. No. 29 12 519.

It is intended to so conduct the switching on and switching off phases of the burner that the lowest possible fuel losses will occur. In general, during cold starting, fuel losses are produced in that a portion of the fuel which is conducted to the burner, due to the still too low burner temperature, is conveyed unburned into the exhaust gas and, consequently, pollutes the environment. Moreover, at the switching off of the burner, measures must be taken for the prevention of fuel losses. Thus, during the vaporization of fuel in the preheated combustion air at switching off there must be avoided a post-vaporization as well as any other further egress of fuel into the combustion chamber. The latter is also necessary due to technical safety reasons in that particularly during operational failures, no after-burning will take place.

For the control of the switching on and switching of phases of the burner provision is made that the fuel chamber of the burner is displaceably arranged in the space which is streamed through by the preheated combustion air so as to be able to regulate the delivery of fuel into the combustion air and in order to avoid fuel losses or an undesirable after-burning subsequent to the switching off of the burner. The fuel chamber is arranged to be hydraulically displaceable wherein the fuel which is to be conducted into the combustion chamber serves concurrently as the hydraulic fluid. This requires the provision of suitable sealing means intermediate the inner space of the hydraulic unit which is under super-atmospheric pressure and the space which is streamed through by the combustion air, as well as the environment, in order to maintain any leakages as low as possible during the adjustment of the fuel chamber.

SUMMARY OF THE INVENTION

Accordingly, it is an object of the present invention to provide a burner which evidences advantageous cold start properties with respect to its fuel requirement and which, in accordance therewith, can be switched off in the normal instance, as well as during operative failure, without afterburning.

Another object of the present invention is to provide a burner with a hydraulically displaceable fuel chamber in which the fuel which is to be conducted into the fuel chamber is usable as a hydraulic operating medium, without thereby adversely affecting a troublefree mixture formation for the intended combustion within the combustion chamber of the burner through uncontrolled fuel penetrating into the combustion chamber from the hydraulic unit, or that fuel will be conveyed into the environment.

The foregoing object is achieved, pursuant to the invention, in a burner of the above-mentioned type. Hereby, the porous walls of the fuel chamber which convey the fuel are separable from the combustion chamber which conveys the combustion air for switching on and switching off of the burner so that during these phases the vaporization process is disruptable. This can be effected, for example, by means of a sleeve which is so inverted over the porous wall that no fuel can enter the combustion chamber. At the switching in of the burner the separation between the porous walls and the combustion chamber is controlled in dependence upon the temperature of the combustion air in the flow chamber. When the combustion air is preheated to such an extent that there can be formed in the flow chamber an ignitable stoichiometric fuel combustion air mixture, then the porous walls of combustion air are exposed. At the switching off of the burner, the porous walls are again separated from the combustion chamber so as to inhibit any vaporization of fuel by the surface of the porous walls in the combustion air within the combustion chamber.

Preferably, the fuel chamber is displaceably arranged in the combustion chamber in opposition to the force of a spring. The spring force is so adjusted that the fuel chamber is maintained out of the combustion chamber by the spring. The fuel chamber is inserted in dependence upon the temperature in the combustion chamber. When the combustion air has reached the temperature which is for the formation of the ignitable, stoichiometric fuel-combustion air mixture, then the fuel chamber is conducted into the combustion chamber. At the switching off of the burner, the fuel chamber is again withdrawn out of the combustion chamber under the effect of the spring.

In an embodiment of the invention it is contemplated that the fuel chamber is arranged so as to be hydraulically displaceable, as well as employing the liquid fuel itself as the hydraulic operating medium. There is thus obtained a simple, compact construction of the burner. In a special construction of the burner there, additionally, is eliminated a special fuel conduit leading to the displaceably arranged fuel chamber.

In addition to the foregoing, in a burner of the above mentioned type the fuel chamber is fastened onto a hydraulic piston which is conveyed within a hydraulic cylinder so that the inner space of the hydraulic unit which is under super-atmospheric pressure and the space which is passed through by the combustion air can be sealed independently of each other along the sliding surfaces. The discharge which extends through the inner space of the hydraulic unit is rigidly connected with the hydraulic cylinder and projects into a recess of the hydraulic cylinder which is slidably arranged on the discharge. For the sealing of the inner space of the hydraulic cylinder which is under super-atmospheric pressure, the hydraulic piston and the discharge support piston rings in a manner known per se.

In order to be able to draw off that portion of the fuel which, during the moving in and out of the fuel chamber, exits through the porous walls into a hydraulic cylinder space which is destined for the receipt of the fuel chamber, connected on the hydraulic cylinder is an overflow conduit for fuel.

BRIEF DESCRIPTION OF THE DRAWINGS

Reference may now be had to the following detailed description of preferred embodiments of the invention; taken in conjunction with the accompanying drawings; in which.

DETAILED DESCRIPTION

Figure 1:
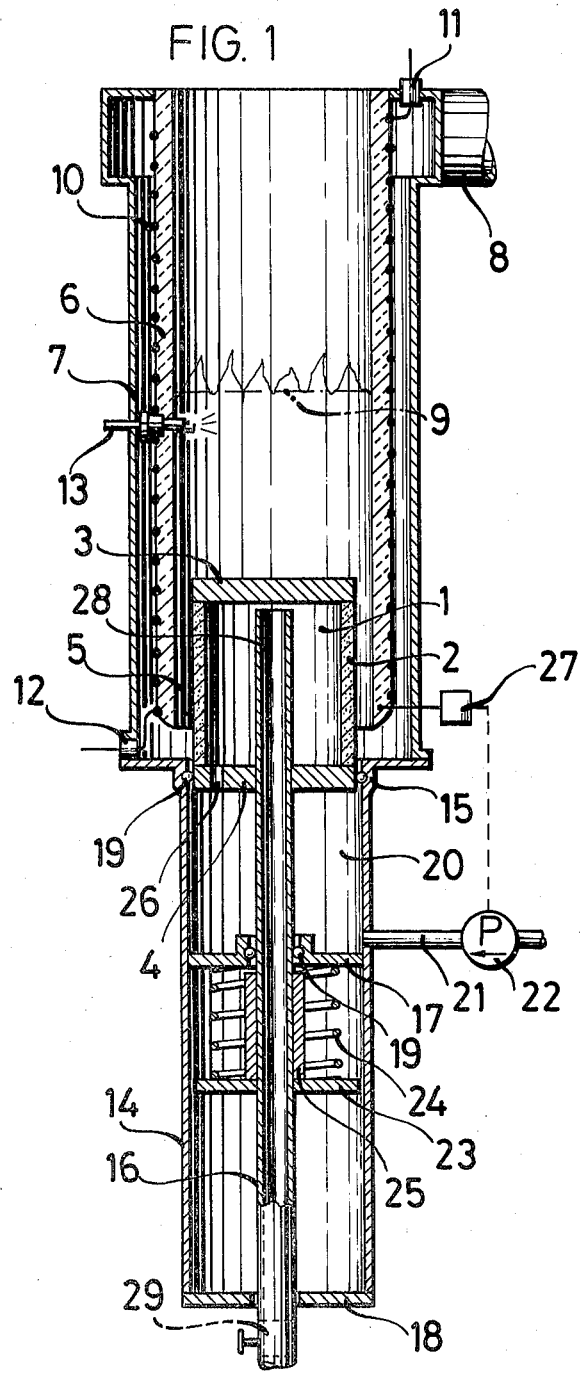
FIG. 1 illustrates a longitudinal sectional view through a first embodiment of a burner constructed pursuant to the invention.

Referring now to FIG. 1 of the drawing, the burner includes a fuel chamber 1 with porous walls 2 which are permeable to the passage of the fuel. In this embodiment the fuel chamber 1 is constructed cylindrically-shaped and covered at both end surfaces thereof with closure plates 3, 4. The closure plates are mounted aligned on the cylindrical porous wall 2 of the fuel chamber 1 and evidence a smooth outer cylindrical surface.

In the illustrated embodiment, the fuel chamber 1 is constructed so as to be displaceable and is shown in FIG. 1 of the drawings in its operative position within a combustion chamber space 5 which is passed through by combustion air. The fuel chamber 1 projects centrally into the combustion chamber which, in this embodiment, also includes the annular space 5 between the outer surface of the porous wall 2 and an inner heat exchanger 6. The combustion air is introduced into the chamber space 5 through an inlet conduit 7 which includes a pipe connector 8 for the combustion air. The inlet conduit 7 encompasses the heat exchanger tube 6 and, concurrently, forms the outer wall of the combustion chamber. The combustion of the fuel-air mixture is effected in a combustion zone 9 within the heat exchanger tube 6. In this embodiment the heat exchanger tube conists of ceramic. However, it can also be constructed of metal. By means of the heat exchanger tube 6 the combustion air which flows within the inlet conduit 7 is preheated through heat emission from the combustion zone 9. Serving for the heating of the combustion air at cold starting there is provided an electrical resistance heater 10 which is would about the ceramic heat exchanger and includes outwardly conducted electrical connectors 11, 12. Within the flow chamber 5 there vaporizes in the preheated combustion air the fuel which passes from the fuel chamber through the porous walls 2. The fuel-air mixture is conducted to the combustion zone 9 and there ignited. Serving for the starting is an ignitor 13 which is inserted into the combustion zone.

The fuel chamber is displaceably supported within a hydraulic cylinder 14 which is flange-mounted on the inlet conduit 7 of the combustion chamber. Adjacent a bearing 15 which supports the fuel chamber 1 about its circumference, a tubular support 16 which is fastened to the closure plate 4 is arranged on the fuel chamber 1, which axially traverses the hydraulic cylinder 14 and is guided in a support bearing 17. The support 16 projects beyond the closure plate 4 of the fuel chamber 1 and is conveyed through a cover member 18 on the outer end of the hydraulic cylinder 14. The bearings 15 and 17 in the hydraulic cylinder include sealing rings 19 which seal an interspace 20 between the two bearings. Through a connector 21 on the hydraulic cylinder 14, with the aid of feed pump 22 there can be introduced liquid fuel into the inner space 20.

At the end of the support 16 projecting beyond the support bearing 17 there is fastened an adjustable support 23 for a spring 24 which serves as a counter-bearing for the support bearing 17. When hydraulic operating medium flows into the inner space 20, conveyed by the feed pump 22, then the fuel chamber 1 is pressed into the flow chamber 5 opposite to the force of the spring 24. The end position of the fuel chamber 1 within the space 5 of the combustion chamber is preset by the position of the support 23 on the support holder 16 with the contact stop 25.

In this embodiment liquid fuel acting as the hydraulic operating medium is conveyed into the inner space 20 of the hydraulic cylinder 14. In an advantageous manner this saves an additional fuel conduit towards the fuel chamber 1 and leads to an extremely compct construction for the burner. The fuel which is present in the inner space 20 flows through a fuel conduit 26 from the inner space 20 of the hydraulic cylinder into the inner space of the fuel chamber 1. The fuel conduit 26, in this embodiment is constructed as a throttle bore in the closure plate 4 of the fuel chamber 1. Excess fuel which has not vaporized on the surface of the porous wall 2 of the fuel chamber 1 is conveyed away through a discharge conduit 28 from the inner space of the fuel chamber 1. Serving as the discharge conduit in this embodiment is, advantageously, the tubular support holder 16, which is conducted within the inner space of the fuel chamber from the closure plate 4 until close to the closure plate 3 so as to cause an annular gap to remain through which the fuel can flow into the discharge conduit 28. By means of a flow regulating valve 29 located in the discharge conduit there is set the required liquid pressure in the fuel chamber 1. Through the discharge conduit 28 the fuel is reconveyed to the supply tank, which is not shown in detail in the drawing.

At the switching off of the feed pump 22 and upon the pulling back of the fuel chamber 1 into the hydraulic cylinder, the fuel can flow off from the inner space 20 through the fuel conduit 26 and from the fuel chamber 1 through the discharge conduit 28, so that the return setting of the chamber is not disturbed.

A circulation of fuel within the fuel chamber is also desired for the operation of the burner. The fuel, in this manner can be protected from overheating, which could lead to cracking. The boiling temperature of the fuel may not be reached.

At the starting of the burner, the fuel chamber 1 is located within the hydraulic cylinder 14. A thermostat 27 measures the temperature in the heat exchanger 6 at the location of transition of the combustion air feed between the inlet conduit 7 and the space 5 and through a suitable switch (not shown) switches on the resistance heater 10. At an adequately preheated combustion air and corresponding temperature at the thermostat 27, a signal is emitted for the actuation of the feed pump 22 at a regulator (not shown). The fuel which flows into the inner space 20 of the hydraulic cylinder presses the fuel chamber 1 into the combustion chamber and concurrently flows through the fuel conduit 26 into the inner space of the fuel chamber 1. A portion of the fuel passes through the porous walls 2 and vaporizes on the surface thereof. The remainder of the fuel flows through the discharge conduit 28 back into the supply tank controlled by the flow regulating valve 29. Within the flow chamber 5 there is formed a stoichiometric fuel-air mixture which is ignited in the combustion zone 9.

During operation of the burner, after sufficient heating of the heat exchanger tube 6, there is switched off the resistance heater 10.

For the switching off of the burner the feed pump 22 is stopped and the fuel infeed blocked. Within the inner space 20 of the hydraulic cylinder the liquid pressure drops off. The fuel chamber 1 is pulled out from the flow chamber 5 by the force of the spring 24. The flame in the combustion zone 9 is extinguished. In this manner not only are fuel losses reduced, but, in particular, no afterburning will occur.

Figure 2:
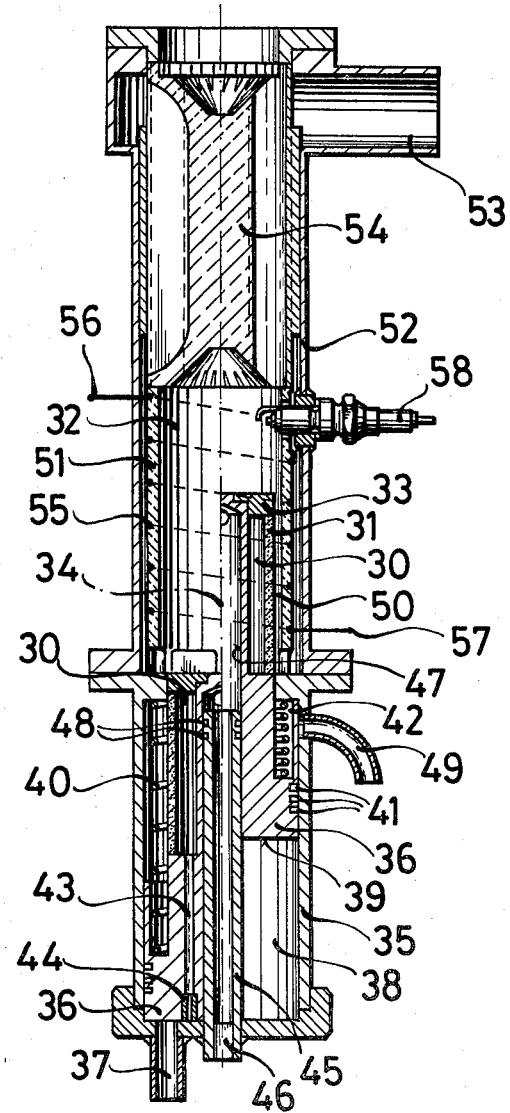
FIG. 2 is a view similar to that of FIG. 1 of a second embodiment of the burner.

Referring to the embodiment of the burner illustrated in FIG. 2 of the drawings, the burner includes a fuel chamber 30 with porous walls 31 which are permeable to the fuel. In this embodiment, the fuel chamber 30 is cylindrically-shaped and covered with a closure plate 33 at the end surface thereof facing towards the combuston zone 32 of the burner. The closure plate is mounted aligned on the cylindrical porous wall 31 of the fuel chamber 30 and evidences a smooth cylindrical surface at its outer rim.

In FIG. 2 of the drawings, the fuel chamber is illustrated in two of its positions. The portion illustrated on the right-hand side of the symmetrical axis 34 of the fuel chamber illustrates the fuel chamber in its operative position; during the operation of the burner; the portion shown on the left-hand side illustrates the fuel chamber 30 in its inoperative position fully inserted into a hydraulic cylinder 35. The fuel chamber 30 is fastened to a hydraulic piston 36 which is displacebly supported within the hydraulic cylinder 35 by means of liquid fuel. The fuel is introduced under pressure at the fuel inlet 37 into the inner space 38 of the hydraulic cylinder 35 and acts on the hydraulic piston 36 on the end surface thereof away from the fuel chamber 30. The hydraulic piston 36 is displaceably arranged in opposition to the force of a spring 40. At its circumference the hydraulic piston includes the piston rings 41 inserted into grooves, which seal the pressurized inner space 38 of the hydraulic cylinder 35 with regard to a hydraulic chamber 42 into which there is moved the fuel chamber 30 during its displacement.

From the inner space 38 of the hydraulic cylinder 35 a fuel conduit 43 leads through the hydraulic piston 36, which includes a throttle 44 and supplies the fuel chamber 30 with fuel. Excess fuel flows from the fuel chamber 30 through a discharge 45 having an outlet 46. The discharge 45 is so fastened on the hydraulic cylinder 35 that no fuel can escape into the environment, and projects into a recess 47 of the hydraulic piston 36, which is slidably arranged on piston rings 48 on the discharge 45.

In the hydraulic chamber 42 an overflow conduit 49 connects for fuel from the fuel chamber 30 entering into the hydraulic chamber. The overflow conduit 49 additionally serves for the drawing off of fuel which enters due to leakages in the region of the piston rings 41 from the inner space 38 of the hydraulic cylinder 35 into the hydraulic chamber 42.

In its operative position, the fuel chamber 30 projects centrally within a combustion chamber 50 which is passed through by preheated combustion air, which in the illustrated embodiment is constructed as an annular space between the porous wall 31 of the fuel chamber 30 and the inner wall of a guide conduit 51.

An undesirable overflowing of fuel from the hydraulic chamber 42 into the combustion chamber 50 is prevented in that fuel which penetrates into the hydraulic space 42 can flow off through the overflow conduit 49.

The combustion air is introduced into the combustion chamber 50 through an inlet conduit 52, which is attached to a recuperator 54 for the combustion air connected with the pipe connector 53. The inlet conduit 52 encompasses the guide conduit 51 and concurrently forms the outer wall of the burner. The combustion of the fuel-air mixture is effected in the combustion zone 32 within the guide conduit 51. In this embodiment, the guide conduit 51 and the recuperator 54 which is connected to the outlet of the combustion zone 32 are formed of ceramic. However, pursuant to the temperature generated in the combustion zone, they can also be constructed of metal. In the recuperator 54, the combustion air which is conveyed into the combustion chamber 50 is preheated by the combustion gases which have been heated in the combustion zone 32. For a heating of the combustion air during cold starting of the burner there is provided an electrical-resistance heater 55 which is mounted on the guide conduit 51 and which includes outwardly conducted electrical connectors 27, 28. In the combustion chamber 21 there vaporizes the fuel exiting from the fuel chamber 1 through the porous walls 2 in the preheated combustion air. The fuel-air mixture is conducted to the combustion zone 3 and there ignited. For starting there serves an igniter 29 which is inserted into the combustion zone.

What is claimed is:

1. In a burner for the formation and combustion of an ignitable mixture of a liquid fuel and combustion air; said burner having an axis, a fuel chamber fillable with said fuel having porous side walls permeable to said fuel for the through-passage of said fuel and a non-perforated closure plate; and a combustion chamber, said combustion chamber including a flow chamber providing for the inlet of combustion air at one end, means for heating said air, and an outlet for heated combustion air at the opposite end of said flow chamber communicating with the interior of said combustion chamber to form a combustion zone; and means for axially displacing said fuel chamber into and out of said combustion chamber so as to form an advanced and a retracted position, respectively; said porous side walls of the fuel chamber being selectively communicable with the interior of said combustion chamber in response to the axial position of said fuel chamber in said combustion chamber so as to facilitate passage of fuel through said porous side walls into said combustion chamber in said advanced position of said fuel chamber into said combustion chamber for the switching on said burner and to prevent passage of fuel through said porous side walls in said retracted position of said fuel chamber from said combustion chamber for switching off said burner.

2. Burner as claimed in claim 1, comprising spring means connected to said fuel chamber and exerting a biasing force for displacing said fuel chamber out of said combustion chamber counter to the flow of liquid fuel advancing said fuel chamber into said combustion chamber.

3. Burner as claimed in claim 1 or 2, comprising hydraulic means for displacing said fuel chamber.

4. Burner as claimed in claim 3, said hydraulic means comprising liquid fuel as a hydraulic operating medium.

5. Burner as claimed in claim 4, comprising a hydraulic cylinder guiding said fuel chamber; said fuel chamber having at least one fuel conduit leading from the inner space of said hydraulic cylinder to the inner space of said fuel chamber; a discharge conduit for said fuel being connected to said fuel chamber; and a flow regulating valve being arranged in said discharge conduit.

6. In a burner for the formation and combustion of an ignitable mixture of a liquid fuel and combustion air; said burner having an axis a fuel chamber fillable with said fuel for the infeed of fuel, said fuel chamber including porous side walls permeable to said fuel and a non-perforated closure plate;, a combustion chamber including a flow chamber providing for the inlet of combustion air at one end, means for heating said air, and an outlet for heated combustion air at the opposite end of said flow chamber communicating with the interior of said combustion chamber to form a combustion zone; and said fuel chamber being axially movable into and out of said combustion chamber so as to form an advanced and a retracted position, respectively, so as to facilitate passage of fuel through said porous side walls into said combustion chamber in said advanced position of said fuel chamber into said combustion chamber and to prevent passage of fuel through said porous side walls in said retracted position of said fuel chamber from said combustion chamber; hydraulic means for displacing said fuel chamber within said combustion chamber in opposition to a counter force, said hydraulic means comprising a hydraulic cylinder guiding said fuel chamber, said hydraulic cylinder including a fuel inlet for the introduction of fuel as a hydraulic operating medium and a hydraulic piston including fuel conduit leading from the interior of said hydraulic cylinder for conveying fuel to the interior of said fuel chamber; and a discharge means for said fuel extending from said fuel chamber through the inner space of said hydraulic cylinder; said hydraulic piston slidably arranged within said hydraulic cylinder, said fuel chamber being fastened to said piston, the end surface of said piston remote from the fuel chamber adjoining the fuel-filled inner space of said hydraulic cylinder, said discharge means being fixedly connected with said hydraulic cylinder and projecting into a recess in said hydraulic piston slidingly movable on said discharge means.

7. Burner as claimed in claim 6, comprising an overflow conduit for fuel being connected to said hydraulic cylinder for draining fuel from that portion of the hydraulic cylinder at the end of the piston adjacent the fuel chamber.

* * * * *